Patented May 23, 1950

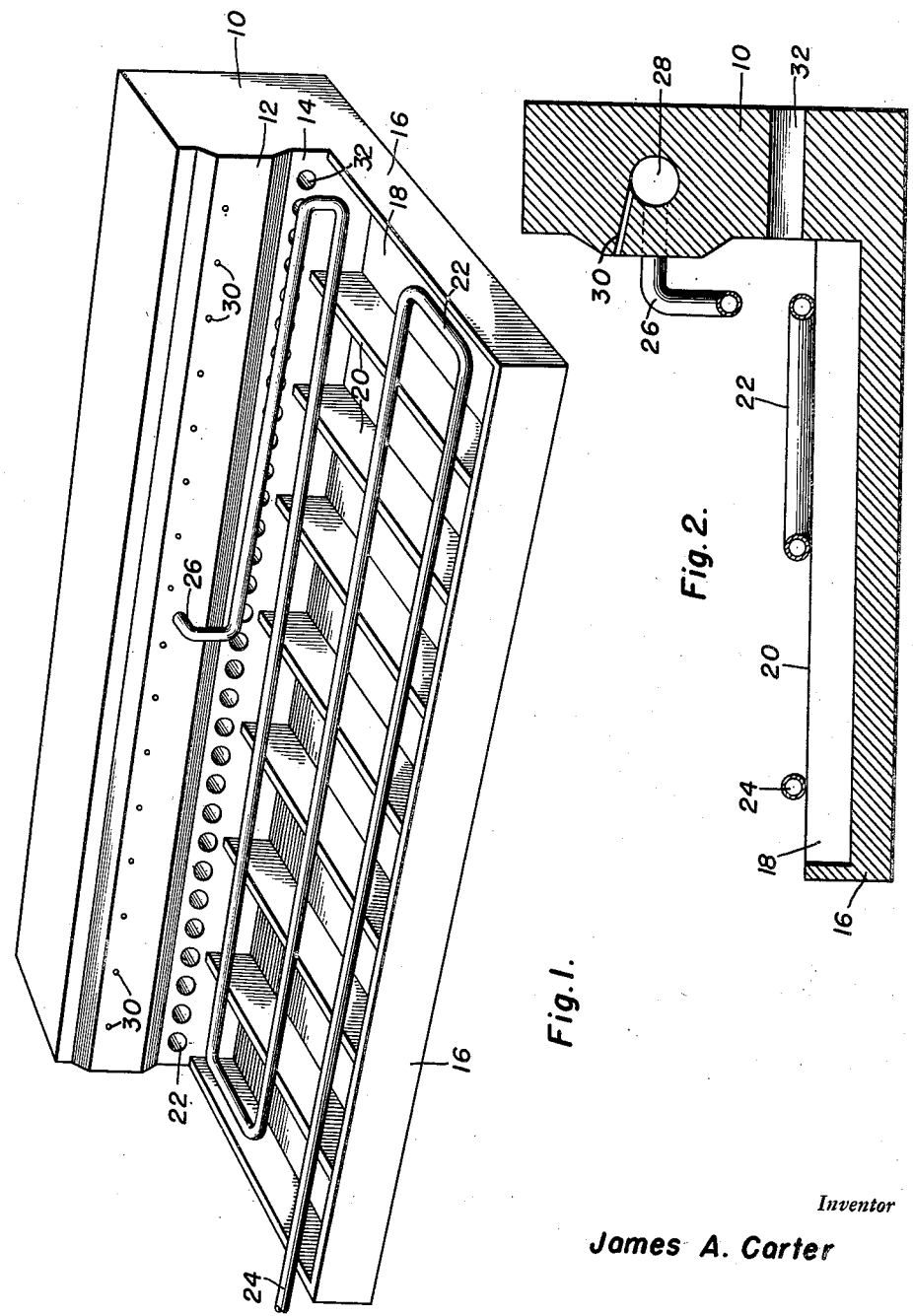

2,508,813

UNITED STATES PATENT OFFICE 2,508,813

DIVIDED STARTING TRAY RETORT BURNER

James A. Carter, Meigs, Ga.

Application May 26, 1947, Serial No. 750,583

4 Claims. (Cl. 158—71)

This invention relates generally to heaters, and more particularly to an oil burning heater of a type comprising an elongated block having a starting receptacle over which the fuel supply line is disposed and having an apertured block with a chamber therein communicating with said supply line, whereby vaporized fuel is burned above said starting receptacle.

A primary object of this invention is to provide a burner of a type which is suitable for use in heating evaporator pans such as are used to convert sugar cane juice into syrup, the device not being limited, however, to this particular use.

Another object of this invention is to provide a burner in which means are incorporated whereby the burner may be initially lighted, the vaporization of the fuel being automatically and continuously accomplished after the burner is once lighted.

Another object of this invention is to provide a burner of this character in which an ample supply of air is provided, thus assuring complete combustion of the fuel and minimizing the amount of soot produced.

Another object of this invention is to provide an adequate air supply from two sides, that is, the top and the bottom of the flame area.

And a last object to be specifically mentioned is to provide a heater of this character which is relatively inexpensive and practicable to manufacture, extremely simple and convenient to use, very versatile and adaptable for different sizes of units such as pans to be heated, and which is generally efficient and durable in service.

With these objects definitely in view, this invention resides in certain novel features of construction, combination and arrangement of parts and portions as will be described hereinafter in detail and particularly set forth in the appended claims, reference being had to the accompanying drawings which form a material part of this application, and in which:

Figure 1 is a perspective view of this improved burner; and

Figure 2 is a transverse sectional view of the burner, to illustrate the construction thereof and to amplify the disclosure of this invention.

Similar characters of reference designate similar or identical parts and portions throughout the views of the drawing.

Referring now to the drawing in detail, it will be noted that this heater includes a generally rectangular block 10 which is preferably provided with a longitudinally disposed rib portion 12 on the side thereof which will be hereinafter referred to as the forward face 14 of the block, and an integral starting receptacle 16.

Referring first to this starting receptacle, it will be noted that the same is generally rectangular and extends forwardly from the block portion 10 from the lower end of the front face 14. This starting receptacle is provided with a plurality of pockets 18 separated by parallel dividing ribs 20, these pockets being adapted to receive a limited quantity of highly volatile fuel such as gasoline, for the purpose of initially heating the coiled portions 22 of the fuel supply line 24, this coiled portion 22 being disposed immediately above the said apron 16, so that upon ignition of the fuel in the pockets 18, this coiled portion of the supply pipe line is sufficiently heated to cause vaporization of the fuel in the line.

The other end 26 of the fuel supply line is inserted into the block 10, preferably at the center point thereof, and communicates with a longitudinally disposed vaporized fuel chamber 28. The ends of this vaporized fuel chamber 28 are closed in any suitable manner, after the fuel chamber has been formed by drilling or by some other suitable process.

A plurality of small diameter channels 30, communicating with the vaporized fuel chamber 28 and extending forwardly and upwardly to open on the forward face of the rib portion 12 of the block 10, are provided to function as fuel outlet jets, the vaporized fuel issuing therefrom being lighted and thereafter providing heat for the normal use of the heater, as well as providing sufficient heat to maintain the block 10 at a sufficiently high temperature to assure the continuous vaporization of the fuel fed thereinto from the fuel supply line 24.

A plurality of air vents 32 are arranged in parallel relation and transversely of the block 10, to communicate the rear of the block 10 with the forward face 14 thereof, and to allow passage of air from the rear of the heater to points beneath the jet apertures 30. The provision of these air vents 32 insures ample supply of air for the complete combustion of the vaporized fuel.

The operation of this invention will be clear from a consideration of the foregoing description of the mechanical details thereof, taken in connection with the above recitation of the objects sought to be achieved thereby, the normal use of this invention comprising the proper connection of the fuel line 24 to a source of supply of kerosene or similar fuel, the initial heating of the coils 22 by lighting a small quantity of gasoline or other highly inflammable fuel placed in the pockets 18 of the starting receptacle and the subsequent placing of the pans or other articles to be heated in contact with the flames issuing from the flame jets 30.

Obviously, the exact shaping and proportionment of the block and starting receptacle and the arrangement of the coils 22 above said starting receptacle are matters of individual preferment and mechanical expediency and limitation of this invention is sought only in accordance with the appended claims, rather than relating to the foregoing description which is thought of as illustrative rather than as limiting.

What is claimed as new and desired to be secured by Letters Patent is:

1. An oil burning heater comprising an upright elongated block having an integral starting receptacle extending longitudinally of the block and laterally offset from the base thereof, a plurality of pockets on the upper surface of said starting receptacle, an elongated fuel chamber in said block and a plurality of spaced small channels communicating with said chamber and opening on the side of said block adjacent said starting receptacle, and a fuel supply pipe extending over said starting receptacle and leading into said chamber.

2. An oil burning heater comprising an upright elongated block having an integral starting receptacle extending longitudinally of the block and laterally offset from the base thereof, a plurality of pockets on the upper surface of said starting receptacle, an elongated fuel chamber in said block and a plurality of spaced small channels communicating with said chamber and opening on the side of said block adjacent said starting receptacle, and a fuel supply pipe extending over said starting receptacle and leading into said chamber, said block having a plurality of air vents extending transversely completely through said block.

3. An oil burning heater comprising an upright elongated block having an integral starting receptacle extending longitudinally of the block and laterally offset from the base thereof, a plurality of pockets on the upper surface of said starting receptacle, an elongated fuel chamber in said block and a plurality of spaced small channels communicating with said chamber and opening on the side of said block adjacent said starting receptacle, and a fuel supply pipe extending over said starting receptacle and leading into said chamber, said block having a plurality of air vents extending transversely completely through said block and opening between said starting receptacle and said channels.

4. An oil burning heater comprising an upright elongated block having an integral starting receptacle extending longitudinally of the block and laterally offset from the base thereof, a plurality of pockets on the upper surface of said starting receptacle, an elongated fuel chamber in said block and a plurality of spaced small channels communicating with said chamber and opening on the side of said block adjacent said starting receptacle, and a fuel supply pipe extending over said starting receptacle and leading into said chamber, said block having a plurality of air vents extending transversely completely through said block and opening between said starting receptacle and said channels, said supply line having a plurality of coils disposed immediately above and parallel to said starting receptacle.

JAMES A. CARTER.

REFERENCES CITED

The following references are of record in the file of this patent:

UNITED STATES PATENTS

| Number | Name | Date |
|---|---|---|
| 525,569 | Vernon | Sept. 4, 1894 |
| 588,520 | West | Aug. 17, 1897 |
| 957,857 | Graves | May 10, 1910 |
| 1,015,288 | Braly | Jan. 23, 1912 |
| 1,293,226 | Smock | Feb. 4, 1919 |
| 1,315,993 | Shepardson | Sept. 16, 1919 |
| 1,670,516 | Margason | May 22, 1928 |